United States Patent
Twiste

(10) Patent No.: US 8,074,785 B2
(45) Date of Patent: Dec. 13, 2011

(54) DEVICE AND METHOD FOR OPTICALLY SCANNING A MACHINE-READABLE LABEL APPLIED TO AN OBJECT

(75) Inventor: Josef Twiste, Paderborn (DE)

(73) Assignee: Wincor Nixdorf International GmbH (DE)

( * ) Notice: Subject to any disclaimer, the term of this patent is extended or adjusted under 35 U.S.C. 154(b) by 680 days.

(21) Appl. No.: 11/985,306

(22) Filed: Nov. 14, 2007

(65) Prior Publication Data

US 2008/0110724 A1 May 15, 2008

(30) Foreign Application Priority Data

Nov. 15, 2006 (DE) .......................... 10 2006 054 115

(51) Int. Cl.
*B65G 37/00* (2006.01)

(52) U.S. Cl. .......... 198/620; 198/717; 198/721; 186/68; 186/69

(58) Field of Classification Search .................. 198/620, 198/418, 418.7, 419.3, 469.1, 570, 817, 836.1, 198/803.11, 717, 721, 725, 690.2, 699.1, 198/340; 186/61, 68, 69
See application file for complete search history.

(56) References Cited

U.S. PATENT DOCUMENTS

| | | | | |
|---|---|---|---|---|
| 285,664 A | * | 9/1883 | Pierce | 198/728 |
| 2,679,852 A | * | 6/1954 | Erie | 134/127 |
| 2,883,036 A | * | 4/1959 | Fox et al. | 198/575 |
| 3,206,001 A | * | 9/1965 | Peppler | 198/728 |
| 3,587,856 A | * | 6/1971 | Lemelson | 209/3.3 |
| 3,622,758 A | * | 11/1971 | Schanne | 235/462.03 |
| 3,734,286 A | | 5/1973 | Simjian | |
| 3,792,234 A | * | 2/1974 | Sturzenegger | 235/483 |
| 3,854,571 A | * | 12/1974 | Siirtola | 198/721 |
| 3,949,194 A | * | 4/1976 | Catto et al. | 235/475 |

(Continued)

FOREIGN PATENT DOCUMENTS

DE 1 295 475 5/1969

(Continued)

*Primary Examiner* — Gene Crawford
*Assistant Examiner* — William R Harp
(74) *Attorney, Agent, or Firm* — Harness, Dickey & Pierce, P.L.C.

(57) ABSTRACT

A device and a method for the optical scanning of a machine-readable label applied to an object are proposed. The device has at least one belt conveyor (1) and one receiving tray, which are located sequentially spaced apart. A scanning device (3) is located between the belt conveyor (1) and the receiving tray. An additional conveyor device (4) is provided close to the belt conveyor (1) and the scanning device (3) which has several carriers (7) running perpendicular to the direction of travel of the belt conveyor (1). Between two carriers (7) there is a space (12) to accommodate an object. The conveying device (4) covers the scanning device (3) completely and the belt conveyor (1) at least partially. An object is placed on the belt conveyor (1) between two carriers (7) with the side carrying the label and taken across the scanning device (3) by the carriers (7). Then the object is taken to the receiving tray by the carriers (7).

7 Claims, 2 Drawing Sheets

U.S. PATENT DOCUMENTS

| | | | | |
|---|---|---|---|---|
| 3,960,640 | A * | 6/1976 | Mort et al. | 156/351 |
| 4,009,369 | A * | 2/1977 | Hayosh et al. | 235/462.39 |
| 4,236,604 | A * | 12/1980 | Warner | 186/61 |
| 4,443,995 | A * | 4/1984 | Myers et al. | 53/443 |
| 4,912,554 | A | 3/1990 | Neri | |
| 4,939,355 | A * | 7/1990 | Rando et al. | 235/462.14 |
| 5,007,525 | A * | 4/1991 | Crawshay | 198/690.2 |
| 5,012,916 | A * | 5/1991 | Cruver | 198/419.3 |
| 5,118,929 | A * | 6/1992 | Scata | 235/462.14 |
| 5,147,027 | A * | 9/1992 | Cruver | 198/419.3 |
| 5,551,531 | A * | 9/1996 | Dumont | 186/61 |
| 5,667,055 | A * | 9/1997 | Gambetti | 198/419.3 |
| 6,431,450 | B1 * | 8/2002 | Lundahl et al. | 235/462.43 |
| 6,557,693 | B1 * | 5/2003 | Freudelsperger | 198/461.1 |
| 6,978,878 | B2 * | 12/2005 | Chiu | 198/419.3 |
| 7,481,309 | B2 * | 1/2009 | Wagner et al. | 198/419.3 |
| 2004/0178049 | A1 * | 9/2004 | Hertz et al. | 198/690.2 |

FOREIGN PATENT DOCUMENTS

| | | |
|---|---|---|
| DE | 2002 150 | 9/1970 |
| DE | 20 06 575 | 6/1979 |
| DE | 37 15 570 A1 | 12/1988 |
| DE | 39 15 217 A1 | 7/1990 |
| DE | 42 35 369 C1 | 3/1994 |
| DE | 695 29 658 T2 | 1/1996 |
| DE | 195 42 647 C2 | 5/1997 |
| DE | 101 41 429 C1 | 1/2003 |
| DE | 101 52 327 A1 | 5/2003 |
| DE | 103 47 540 A1 | 5/2005 |

* cited by examiner

DEVICE AND METHOD FOR OPTICALLY SCANNING A MACHINE-READABLE LABEL APPLIED TO AN OBJECT

BACKGROUND OF THE INVENTION

1. Technical Field

The invention to a device and a method for optically scanning a machine-readable label applied to an object.

2. Discussion

Such devices and methods are employed, for example, at the check out lanes of a self-service store to read the objects selected by a customer. The objects to be scanned are items. Checking the items out is supposed to take place automatically so that the presence of a check out person is not needed. The label is, for example, a bar code. One or more scanning devices are arranged on a conveyor device in order to read the label on the product. Care must be taken that the items are brought individually to the scanning device and that the label is read by the scanning device when the object with the side showing the label is lying on the belt. The latter is particularly important since most items have labels in only one place and there is a possibility that the customer places the items on the belt with the side having the label downward. Items placed in this position cannot be read by a scanning device which is positioned above or to the side of the belts. If an item cannot be checked out, it is returned to the customer and the customer is required to place the item one more time in a different position on the belt. This results in a delay when checking the items out.

From the prior art DE 101 41 429 C1 a device is known for optically scanning labels in which a scanning device is located in a space between two belts. The scanning device allows a label on the underside of an item facing the belts to be read. The scanning device is part of a hollow body. To ensure that even very small objects pass from one belt to the other or arrive at a receiving tray, the gap and the scanning device positioned in the space are kept very narrow. In a second embodiment, the transparent hollow body is in the shape of a cylinder, the axis of which is aligned parallel to the return pulleys of the belts und which rotates at a speed synchronized to the speed of the belts. The disadvantage is that the scanning device involves a cost-intensive special installation because of the requirements mentioned and the transportation and identification of small objects cannot be guaranteed.

SUMMARY OF THE INVENTION

On the other hand, the device in accordance with the invention has the advantage that the objects, independently of their size, can be conducted reliably across the scanning device by an additional transportation device. The transportation device is equipped with several slats or carriers which ensure that the objects are taken individually past the scanning device and are read thereby. There are no special requirements for the size and the shape of the scanning device. The scanning device can be a standard device such as is used in known checkout systems. The apparatus can therefore be produced economically.

The carriers are advantageously moved at the same speed as the conveyor belt. In this case a relative speed between the carriers and the conveyor belt is avoided which can lead to undesirably high forces affecting the carriers and to a change in position of the objects on the belt because of the friction between the conveyor belt and the objects.

The carriers are matched regarding their shape and their material to the area in which the device operates and the objects, or goods, offered in that area. Since the carriers are advantageously moved at the same speed as the conveyor belt, no force is exerted on the objects by the carriers in the area of the conveyor belt. There is no exertion of force by the carriers on the objects during the conveyance process until the area of the scanning device. The surface of the scanning device with which the objects come into contact as they are being transported is advantageously smooth in order to minimize the friction between the goods and the surface of the scanning device. When selecting the material and the shape of the carriers care must be taken that the resulting strength of the carriers is adequate to withstand the frictional forces and to transport the objects in a reliable manner across the scanning device.

It must be taken into account with the shape of the carriers and their position relative to the conveyor belt that both small flat objects as well as objects with a commensurate height can be transported. The distance between the carriers and the conveyor belt as well as the distance between the carriers and the scanning device is advantageously less than the smallest object to be transported in the area of use. In addition, the working surface with which the carriers can interact with the objects is advantageously selected large enough that the largest object to be transported in the area of use is collected and pushed past the scanning device.

The carriers cover the scanning device and at least one section of the conveyor belt and the receiving tray which the scanning device is facing. In this way it is ensured that the carriers take the objects first from the conveyor belt to the scanning device, than past the scanning device and finally from the scanning device onto the receiving tray.

Various possibilities exist for bringing the objects into cooperative action with the carriers. To give one example of an embodiment, the transportation device with the carriers extends from the area in which the user places his objects, his items on the conveyor belt to the area of the receiving tray in which the user removes his objects again. With this embodiment the customer is encouraged to place his objects between two carriers on the conveyor belt.

With this first embodiment the user takes his objects individually to the carriers, whereas with a second embodiment as an example the carriers on the transportation device are brought to the objects already lying on the conveyor belt from the side or from above. In this case, the area in which the objects are positioned between the carrier bars is restricted to a shorter distance than in the first embodiment.

In accordance with an advantageous embodiment of the invention, the carriers of the conveying device are attached to two conveying machines. The conveying machines can be conveyor belts or conveyor chains which run to the side and above the belt conveyor and the scanning device. The conveying machines are moved by a drive. In accordance with a further advantageous embodiment of the invention, the drive for the conveyor belt can additionally drive the conveyor device with the carriers.

In accordance with a further advantageous embodiment of the invention, the carriers are configured as bars or slats. They are attached at their ends to the conveyor belts or chains running above and to the side of the belt conveyors. They accordingly extend across the entire or almost the entire width of the belt conveyor. In this way the entire width of the belt conveyor can be used to place the objects. The distance between the bars or slats is selected depending on the intended use of the device such that the space available is sufficient to be able to place any kind of available object in the area of use between any two bars or slats on the belt conveyor.

In accordance with a further advantageous embodiment of the invention, the carriers are part of a secondary belt conveyor which has recesses to receive objects. The recesses may be round, oval, rectangular or any type of polygon. The bars or slats which are formed by two successive recesses perpendicular to the conveyor device may be thicker than the sections of the secondary belt conveyor running parallel to the conveyor device. The thickness brings increased stability to the sections running perpendicular to the conveyor device.

In accordance with a further advantageous embodiment of the invention, the carriers lie directly on the belt conveyor. This ensures that even thin and flat objects are picked up by the carriers and taken across the scanning device.

In accordance with the method under the invention, objects are automatically read which are provided with a label and which are placed on a belt conveyor of a device for reading in such a way that the label is facing the belt conveyor. If an object is placed on a belt conveyor between two carriers with the side showing the label, it is taken by the carriers past a scanning device and the label is scanned there. Finally, the object is taken to a receiving tray by the carriers.

Additional advantages and advantageous embodiments of the invention can be found in the following description, the drawing and the claims.

DESCRIPTION OF THE PREFERRED EMBODIMENTS

Figure 1:
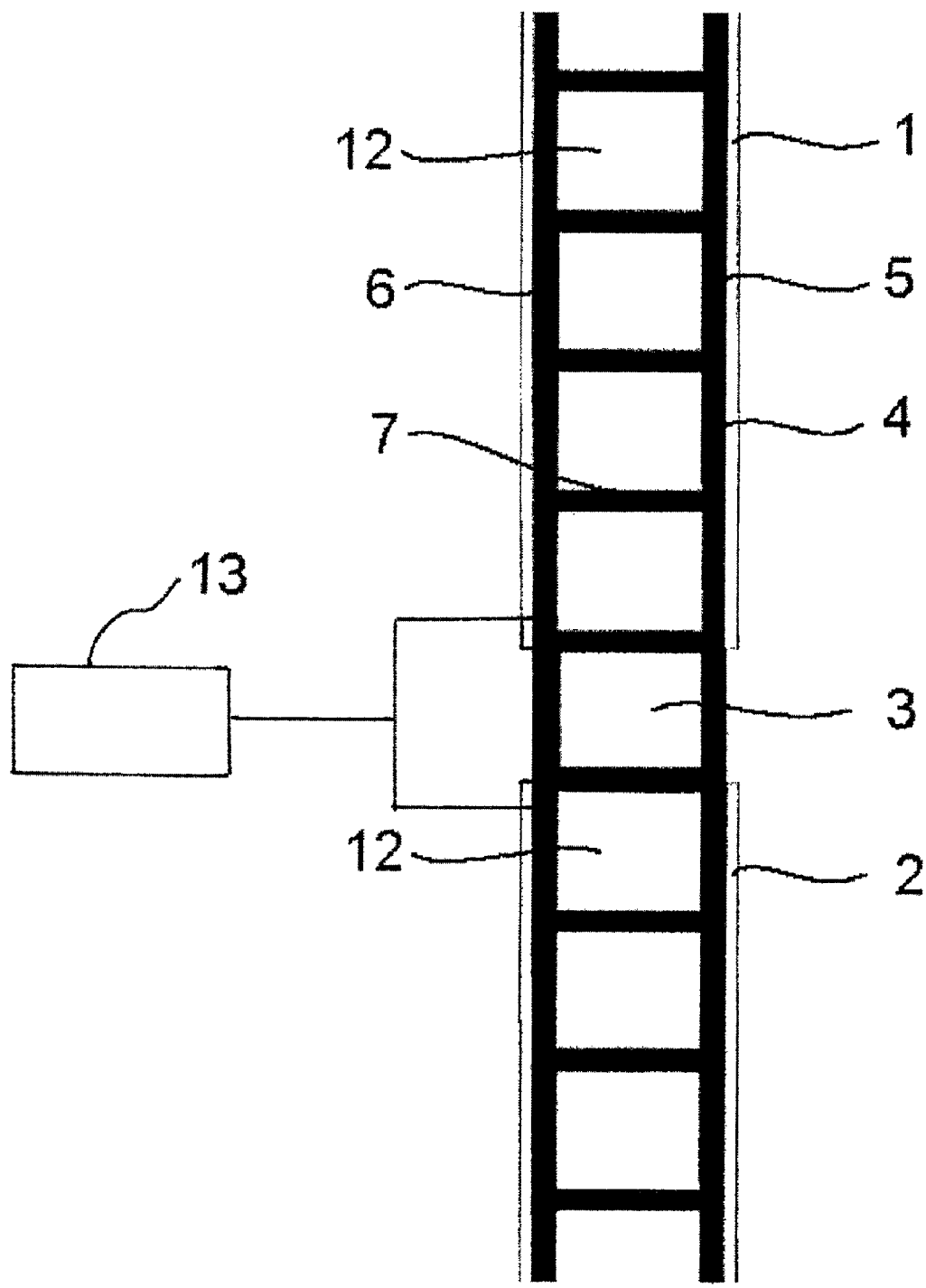
FIG. 1 shows a device for optically scanning a machine-readable code applied to an object viewed from above.
Figure 2:
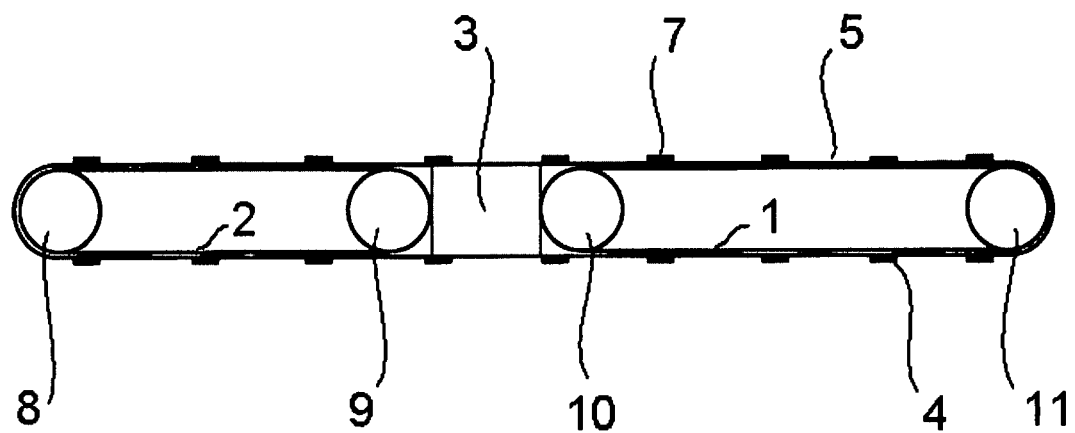
FIG. 2 shows the device from FIG. 1 in a side view.

A device for optically scanning a machine-readable label applied to an object having a first belt conveyor 1, a second belt conveyor 2 and a scanning device 3 is shown in FIGS. 1 and 2. It is also possible to use only belt conveyor 1 and one receiving tray after the scanning device. In the embodiment shown as an example, the scanning device 3 is located between the two belt conveyors 1 and 2. Parallel to the two belt conveyors 1 and 2 runs a supplementary conveyor device 4 which consists essentially of two conveyor belts 5 and 6 and slats 7 located between the conveyor belts. The two conveyor belts 5 and 6 and the slats 7 run directly on the surface of the two belt conveyors 1 and 2 and of the scanning device 3. In order to be able to use as large an area of the belt conveyor 1 as possible when placing objects not shown in the drawing on the belt conveyor 1, the two conveyor belts 5 and 6 run along the sides of the two belt conveyors 1 and 2. The two belt conveyors 1 and 2 are guided by return pulleys 8, 9, 10 and 11. The supplementary conveyor device 4 extending over both belt conveyors 1 and 2 is guided by the two return pulleys 8 and 11. The drive device 13 can drive the two belt conveyors 1 and 2 and the supplementary conveyor device.

An object can be placed in the pocket or area 12 on/of the first belt conveyor 1 created by the conveyor belts 5 and 6 and by two adjacent slats 7. Only one object should be placed in each of the areas. The first belt conveyor 1 transports the object to the scanning device 3. No force is applied to the objects by the slats 7 until the scanning device 3 is reached. As they pass from the belt conveyor 1 onto the scanning device 3, the objects are taken by the slats 7 of the conveyor device 4 and carried by them across the surface of the scanning device 3 to the second belt conveyor 2. Finally, the objects reach the belt conveyor 2 by way of the slats 7 and, as soon as they are on the belt conveyor 2, passed on by the belt conveyor 2. At the end of the second belt conveyor 2, the objects can be removed again.

What is claimed is:

1. A method for scanning a machine-readable label on a retail item selected by a customer in a self-service store, said method comprising:
    providing a first conveyor having an upper surface;
    placing a second conveyor over the upper surface of the first conveyor, said second conveyor having a plurality of slats extending across the first conveyor to define pockets therebetween for receiving the retail items;
    moving the first and second conveyors at the same speed toward a scanner, with the first conveyor carrying the retail items on its upper surface with it towards the scanner; and
    when the retail item is immediately adjacent the scanner, using the slats instead of the first conveyor to carry the retail item across the scanner.

2. The method of claim 1, further comprising disposing the second conveyor around the first conveyor, wherein the plurality of slats lie directly on the upper surface of the first conveyor.

3. The method of claim 1, further comprising disposing the second conveyor around the first conveyor and the scanner such that the second conveyor encircles the first conveyor and the scanner.

4. The method of claim 1, further comprising placing the retail item on the first conveyor such that a side of the retail item containing the label is directly facing the upper surface of the first conveyor.

5. A device for use in a self-service store for optically scanning a machine-readable label applied to a retail item, comprising:
    a first belt conveyor having a first upper surface and being guided by a first pair of pulleys;
    a second belt conveyor having a second upper surface and being guided by a second pair of pulleys;
    an optical scanning device positioned between the first belt conveyor and the second belt conveyor;
    an additional conveyor device disposed around the first and second belt conveyors and the scanning device, comprising:
        first and second conveyor organs spaced apart from each other so as to lie directly on the first and second upper surfaces of the first and second belt conveyors and run along sides of the first and second belt conveyors;
        a plurality of carriers attached to the conveyor organs and positioned perpendicular to the direction of conveyance of the first and second belt conveyors so as to lie directly on the first and second upper surfaces of the belt conveyors;
    the additional conveyor device extending around both belt conveyors such that the conveyor organs encircle the first and second belt conveyors and the scanning device and are guided by one of the first pair of pulleys and one of the second pair of pulleys; and
    a drive device configured to drive the first and second belt conveyors and the additional conveyor device conveyor device at the same speed;
    wherein the plurality of carriers and the conveyor organs cooperate to define a corresponding plurality of pockets for receiving the retail item.

6. The device of claim 5, wherein the one of the first pair of pulleys and the one of the second pair of pulleys are return pulleys each spaced outermost from the scanning device.

7. The device of claim 5, wherein the carriers include slats having an extension in the vertical direction.

\* \* \* \* \*